(12) United States Patent
Fukushima

(10) Patent No.: US 6,999,655 B2
(45) Date of Patent: Feb. 14, 2006

(54) OPTICAL COMMUNICATION SYSTEM AND OPTICAL COMMUNICATION METHOD HAVING CONFIDENTIALITY

(75) Inventor: Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/063,557

(22) Filed: Feb. 24, 2005

(65) Prior Publication Data
US 2005/0158055 A1 Jul. 21, 2005

Related U.S. Application Data

(63) Continuation of application No. PCT/JP03/00173, filed on Jan. 10, 2003.

(51) Int. Cl.
*G02B 6/26* (2006.01)
*H04J 14/02* (2006.01)

(52) U.S. Cl. .......................... 385/28; 385/11; 385/123; 398/65; 398/81

(58) Field of Classification Search ................ 385/11, 385/24, 31, 27, 28, 123, 124, 33, 26; 398/65, 398/66, 67, 81
See application file for complete search history.

(56) References Cited

U.S. PATENT DOCUMENTS

| | | | |
|---|---|---|---|
| 5,930,414 A | 7/1999 | Fishman et al. | 385/11 |
| 6,271,952 B1 * | 8/2001 | Epworth | 398/147 |
| 6,671,464 B1 * | 12/2003 | Kikuchi | 398/65 |
| 6,694,273 B2 * | 2/2004 | Kurooka et al. | 702/69 |
| 6,748,126 B2 * | 6/2004 | Koch et al. | 385/11 |
| 6,829,440 B2 | 12/2004 | Ooi et al. | 398/148 |
| 2002/0012431 A1 | 1/2002 | Wang | 385/11 X |
| 2002/0012487 A1 * | 1/2002 | Damask | 385/15 |

FOREIGN PATENT DOCUMENTS

| | | |
|---|---|---|
| JP | 02-171051 | 7/1990 |
| JP | 11-196046 | 7/1999 |
| JP | 2001-352303 | 12/2001 |
| JP | 2002-33701 | 1/2002 |
| JP | 2002-101094 | 5/2002 |

OTHER PUBLICATIONS

International Search Report for Application PCT/JP03/00173 mailed Apr. 15, 2003.

* cited by examiner

*Primary Examiner*—Brian M. Healy
(74) *Attorney, Agent, or Firm*—Staas & Halsey LLP

(57) ABSTRACT

The present invention has an object to provide an optical communication system which keeps the confidentiality of information at the optical level to ensure the high safety. To this end, the optical communication system according to the present invention comprises: a PMD providing apparatus that gives the polarization-mode dispersion (PMD) which is changed in accordance with a variable pattern previously determined between an optical sender and an optical receiver to an optical signal output from the optical sender; to send the optical signal to an optical line network; and a PMD restoring apparatus that gives the PMD negating the PMD provided by the PMD providing apparatus to the optical signal propagated through the optical line network and restores the optical signal to the state at the transmission time, to send it to the optical receiver.

16 Claims, 2 Drawing Sheets

OPTICAL COMMUNICATION SYSTEM AND OPTICAL COMMUNICATION METHOD HAVING CONFIDENTIALITY

This application is a continuation of PCT/JP03/00173, filed on Jan. 10, 2003.

BACKGROUND OF THE INVENTION

1. Field of the Invention

The present invention relates to an optical communication system and an optical communication method, for transmitting confidential information by an optical signal.

2. Description of the Related Art

Conventional optical communication merely receives an emitted light to transmit information, and accordingly, there has not been any device for keeping the confidentiality of transmitted information against a third party. In one-on-one optical communication between two points, usually there is not caused a failure even if information transmitted by a light is not kept confidential. However, in an optical network having an optical add/drop multiplexing (to be referred to as OADM hereunder) function of dropping or adding a specific wavelength of a wavelength division multiplexed (to be referred to as WDM hereunder) signal light or an optical cross-connecting (to be referred to as OXC hereunder) function of performing the routing of optical signals on their own without converting the optical signals into electric signals, since many users share a fiber network in the network, it is possible for a third party to fetch the optical signal to receive it. Further, it is also possible for this third party to amplify the original optical signal after fetching, so as to cover up the interception from an interested party. Optical signals communicated in the existing optical communication system are considered to be in a vulnerable state to network providers or hackers of malicious intent.

In the existing optical communication systems, the encryption processing by means of software is performed on an electric signal which is used for the optical modulation in accordance with transmitted information. However, such encryption by means of software may be defeated by means of software with a high possibility. Even if a cipher cannot be broken in real time, sometimes, the cipher can be broken if the encrypted signal is recorded to be processed for a long stretch of time utilizing a large-scale computer.

Contrary to such encryption of electric signal before the optical modulation, if it becomes possible to encrypt an optical signal itself, it is impossible to break a cipher unless a hardware corresponding to this cipher is not provided on the reception side. Namely, even if the encrypted optical signal is converted into an electric signal to be recorded by a light receiving element, since information at the optical level (for example, phase information or the like) is lost at the reception time, it is hard to break the cipher even if the large-scale computer is utilized.

As a proposal of technology for realizing the keeping of information confidential at the optical level, there is known a spread optical spectrum communication system or the like. This spread optical spectrum communication system is obtained by basically applying a spread spectrum communication system in radio transmission to an optical domain. It is well known that the spread spectrum communication system in radio transmission has the excellent confidentiality, as apparent from the background that it was initially developed for the military purpose.

However, the spread optical spectrum communication system as described above has a configuration significantly different from that of the existing optical communication system, and therefore, has a drawback in that it is difficult to perform the application thereof only by adding a simple hardware to the existing system or only by reconstructing the existing system. To be specific, for example, in the existing optical communication system in which a WDM signal light containing optical signals of 40 waves having different wavelengths is transmitted, after the system construction, it is difficult to apply the spread optical spectrum communication to the optical signals of some waves (for example, optical signals of 4 waves) among the optical signals of 40 waves, to add the physical confidentiality them.

The development of an optical communication system which transmits optical signals of high bit rate, for example 40 Gbit/s or the like, over a long distance, is now progressed. As one problem in such an optical communication system, there has been known the degradation of transmission characteristic due to an occurrence of polarization-mode dispersion (to be referred to as PMD hereunder). This PMD is a group delay time difference caused between two cross polarization mode components of an optical signal propagated through a birefringent medium. An optical fiber generally utilized as an optical transmission path is ideally a transmission medium with axial symmetry, but actually causes the birefringence due to the fluctuation from the roundness caused by the defectiveness in manufacture, the coating processing, the application of stress with the cable forming or the like. Therefore, in the case where the optical signals of high speed such as 40 Gbit/s are transmitted over a long distance using the birefringent medium such as the optical fiber, it becomes important to compensate for the transmission characteristic degradation due to the PMD. As a technology relating to the PMD compensation, there has been proposed in Japanese Unexamined Patent Publication No. 11-196046 the technology for dynamically compensating for the PMD by a PMD compensator disposed on the reception side of an optical fiber transmission path while monitoring an occurrence state of the PMD in a transmitted light.

Such a known PMD compensator as described above requires time for detecting the PMD which irregularly fluctuates due to a change in environment or the like, and therefore, is able to automatically compensate for the PMD which is fluctuated at a relatively slow speed or the constant PMD. This means, conversely, that it is difficult to perform the reception processing of optical signals in which the PMD irregularly fluctuating at a high speed occurred, even if the known PMD compensator is used. Therefore, as one means for keeping the information confidential at the optical level, the positive utilization of the PMD which has been regarded as a factor of the transmission characteristic degradation is considered to be possible.

The present invention has been accomplished in view of the above problem and has an object to provide an optical communication system and an optical communication method, for keeping information confidential at the optical level to ensure the high safety.

SUMMARY OF THE INVENTION

In order to achieve the above object, according to the present invention, there is provided an optical communication system having the confidentiality, for transmitting and receiving optical signals between an optical sender and an optical receiver via an optical transmission path, comprising: a polarization-mode dispersion providing apparatus that includes a first element which gives the variable polarization-mode dispersion to an optical signal transmitted from the optical sender, and drives the first element in accordance with a variable pattern previously determined between the optical sender and the optical receiver, to send the optical signal provided with the polarization-mode dispersion to the optical transmission path; and a polarization-mode dispersion restoring apparatus that includes a second element which gives the variable polarization-mode dispersion to the optical signal sent from the optical transmission path to the optical receiver and also has a configuration and a characteristic substantially same as those of the first element, and drives the second element in accordance with the variable pattern, to give the optical signal the polarization-mode dispersion negating the polarization-mode dispersion provided by the polarization-mode dispersion providing apparatus, thereby sending the optical signal restored to a state at the transmission time, to the optical receiver.

In the optical communication system of the above configuration, the polarization-mode dispersion which is changed in accordance with the variable pattern is provided to the optical signal sent from the optical sender to the optical receiver, by the polarization-mode dispersion providing apparatus. The optical signal provided with this polarization-mode dispersion is propagated through the optical transmission path, and thereafter, is provided with the polarization-mode dispersion which is changed in accordance with the variable pattern coincident with the variable pattern used on the transmission side, by the polarization-mode dispersion restoring apparatus including the second element having the configuration and characteristic substantially same as those of the first element, so that the polarization-mode dispersion provided by the polarization-mode dispersion providing apparatus is negated, and the optical signal is restored to the state at the transmission time before input to the polarization-mode dispersion providing apparatus. As a result, the confidentiality of information transmitted by the optical signal is kept by providing the polarization-mode dispersion at the optical level, and the optical communication ensuring the high safety is realized.

Further, according to the present invention, there is provided an optical communication method having the confidentiality, for transmitting and receiving optical signals between an optical sender and an optical receiver via an optical transmission path, comprising: driving a first element which gives the variable polarization-mode dispersion to an optical signal transmitted from the optical sender, in accordance with a variable pattern previously determined between the optical sender and the optical receiver, to send the optical signal provided with the polarization-mode dispersion to the optical transmission path; and driving a second element which gives the variable polarization-mode dispersion to the optical signal sent from the optical transmission path to the optical receiver and also has a configuration and a characteristic substantially same as those of the first element, in accordance with the variable pattern, to give the optical signal the polarization-mode dispersion negating the provided polarization-mode dispersion, thereby sending the optical signal restored to a state at the transmission time, to the optical receiver.

Other objects, features and advantages of the present invention will become apparent from the following explanation of the embodiments, in conjunction with the appended drawings.

DESCRIPTION OF THE PREFERRED EMBODIMENTS

Figure 1:
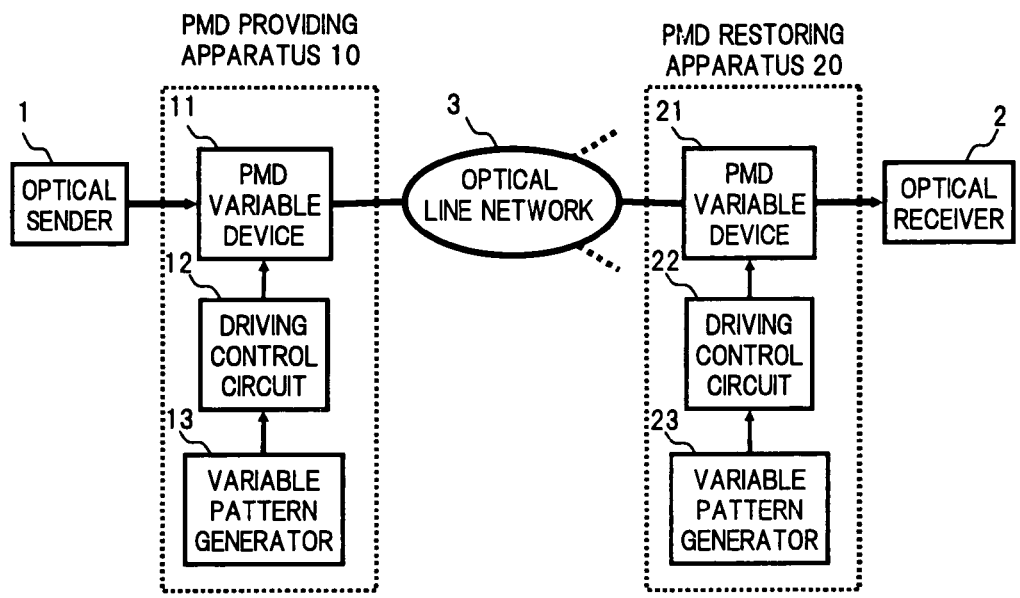
FIG. 1 is a block diagram showing a first embodiment of an optical communication system according to the present invention.

There will be described embodiments for implementing an optical communication method and an optical communication system having the confidentiality according to the present invention, with reference to the accompanying drawings. The same reference numerals denote the same or equivalent parts in all drawings.

FIG. 1 is a block diagram showing a first embodiment of the optical communication system according to the present invention.

In FIG. 1, the present optical communication system is configured so that, for example in an optical network in which an optical sender 1 and an optical receiver 2 are connected to each other via an optical line network 3, a PMD providing apparatus 10 is disposed on an output of the optical sender 1 and also a PMD restoring apparatus 20 is disposed on an input of the optical receiver 2, to realize the confidentiality of an optical signal transmitted from the optical sender 1 to the optical receiver 2 via the optical line network 3, at the optical level.

The optical sender 1 has a known configuration for generating an optical signal of, for example, 10 Gbit/s or the like, modulated in accordance with a data signal, to output the modulated optical signal to the PMD providing apparatus 10. The optical signal transmitted from this optical sender 1 specifically consists of the header portion indicating additional information such as the address of destination and the like, and the payload portion indicating data.

The PMD providing apparatus 10 includes, for example, a PMD variable device 11 as a first element, to which the optical signal from the optical sender 1 is input, a driving control circuit 12 controlling a driving condition of the PMD variable device 11, and a variable pattern generator 13 generating a variable pattern previously determined between the optical sender 1 and the optical receiver 2. This PMD providing apparatus 10 supplies a driving control signal which is generated in the driving control circuit 12 according to the variable pattern output from the variable pattern generator 13, to the PMD variable device 11, to provide the PMD which is changed in accordance with the variable pattern, to the optical signal from the optical sender 1, thereby sending out the optical signal provided with the PMD to the optical line network 3.

The PMD restoring apparatus 20 receives, for example, the optical signal which is propagated through the optical line network 3 to be sent toward the optical receiver 2. This PMD restoring apparatus 20 includes a PMD variable device 21 as a second element which has a configuration and a characteristic same as those of the PMD variable device 11 in the PMD providing apparatus 10, a driving control circuit 22 controlling a driving condition of the PMD variable device 21, and a variable pattern generator 23 generating the variable pattern previously determined between the optical sender 1 and the optical receiver 2. The PMD restoring apparatus 20 supplies a driving control signal which is generated in the driving control circuit 22 according to the variable pattern output from the variable pattern generator 23, to the PMD variable device 21, to give the optical signal from the optical line network 3 the PMD contradictory to the PMD provided by the PMD providing apparatus 10 on the transmission side, thereby restoring the optical signal to the original polarization state to output the restored optical signal to the optical receiver 2.

The optical receiver 2 has a typical configuration for receiving the optical signal output from the PMD restoring apparatus 20 to demodulate the optical signal, and verifying the destination of the optical signal based on information of the header portion to identify the data signal contained in the payload portion of the pertinent optical signal.

Figure 2:
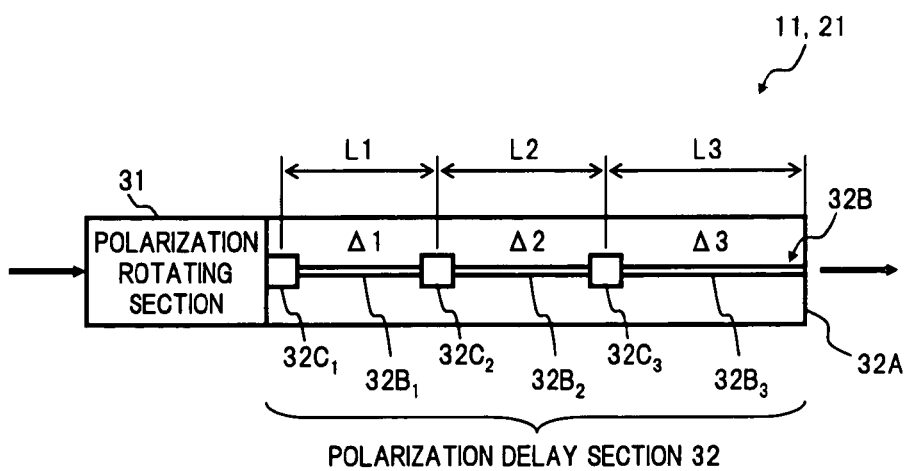
FIG. 2 is a block diagram showing a specific example of a PMD variable device in the first embodiment.

FIG. 2 is a block diagram showing a specific example of each of the PMD variable devices 11 and 12 used in the PMD providing apparatus 10 and the PMD restoring apparatus 20.

The respective PMD variable devices 11 and 21 shown in FIG. 2 have the same configuration and the same characteristic as described above, and here, each comprises a polarization rotating section 31 and a polarization delay section 32. The polarization rotating section 31 rotates the polarization of the optical signal sent from the optical sender 1 or the optical line network 3 in accordance with the driving control signal output from the driving control circuit 12 or the driving control circuit 22, to output the optical signal whose polarization is rotated, to the polarization delay section 32. Note, the polarization rotation here means not only the axial rotation of the linear polarization but also the rotation in general on Poincare sphere. For example, the movement on the meridian for when the Poincare sphere is regarded as the earth is also the rotation. As the polarization rotating section 31, it is possible to use one in which a half-wave plate ($\lambda/2$ plate) and a quarter-wave plate ($\lambda/4$ plate) are arranged sequentially along an optical path, or a Farady rotator having a variable rotation angle, a liquid crystal or the like. However, the configuration of the polarization rotating section 31 is not limited to the above example.

In the polarization delay section 32, the optical signal from the polarization rotating section 31 is input to one end of an optical waveguide 32B formed on a crystal substrate 32A having an electro-optic effect, of for example, lithium niobate ($LiNbO_3$: to be referred to as LN) or the like. A plurality of polarization conversion devices is inserted into the optical waveguide 32B at required intervals. To be specific, here, three polarization conversion devices $32C_1$, $32C_2$ and $32C_3$ are arranged on the optical waveguide 32B. The polarization conversion device $32C_1$ is disposed in the vicinity of one end of the optical waveguide 32B positioned on the polarization rotating section 31 side, the polarization conversion device $32C_2$ is disposed on the optical waveguide 32B at a position which is apart from the polarization conversion device $32C_1$ by a distance L1, and further, the polarization conversion device $32C_3$ is disposed on the optical waveguide 32B at a position which is apart from the polarization conversion device $32C_2$ by a distance L2. Note, a distance from the polarization conversion device $32C_3$ to the other end of the optical waveguide 32B is L3. Each of the polarization conversion devices $32C_1$ to $32C_3$ has a function of inter-converting cross polarization mode components of the optical signal propagated through the optical waveguide 32B, in accordance with the driving control signal from the driving control circuit 12 or the driving control circuit 22.

In the polarization delay section 32 having such a configuration as described above, the optical signal input to the optical waveguide 32B is propagated through an optical waveguide portion $32B_1$ between the polarization conversion devices $32C_1$ and $32C_2$, so that a group delay time difference of $\pm\Delta1$ (positive and negative signs are changed according to the setting of the polarization conversion device $32C_1$) is caused between the cross polarization mode components. Further, the optical signal is propagated through an optical waveguide portion $32B_2$ between the polarization conversion devices $32C_2$ and $32C_3$, so that a group delay time difference of $\pm\Delta2$ (positive and negative signs are changed according to the setting of the polarization conversion device $32C_2$) is caused between the cross polarization mode components. Furthermore, the optical signal is propagated through an optical waveguide portion $32B_3$ behind the polarization conversion device $32C_3$, so that a group delay time difference of $\pm\Delta3$ (positive and negative signs are changed according to the setting of the polarization conversion device $32C_3$) is caused between the cross polarization mode components.

Next, there will be described an operation of the optical communication system according to the first embodiment.

In the optical communication system having the above configuration, when an optical signal of 10 G/bit/s or the like is transmitted from the optical sender 1, the optical signal is given to the PMD variable device 11 in the PMD providing apparatus 10. The driving control signal which is generated in the driving control circuit 12 according to the variable pattern generated in the variable pattern generator 13, is supplied to the polarization rotating section 31 and to each of the polarization conversion devices $32C_1$ to $32C_3$ of the polarization delay section 32, which configure the PMD variable device 11. For the optical signal input to the PMD variable device 11, a portion equivalent to the payload exclusive of the header is subjected to the polarization rotation which is changed at a high speed in accordance with the variable pattern, in the polarization rotating section 31. Thereafter, the optical signal is propagated through the optical waveguide portions $32B_1$ to $32B_3$ sequentially, so that a group delay time difference which is changed at a high speed in accordance with the variable pattern is given between the cross polarization mode components of the optical signal. Note, here a portion equivalent to the header of the optical signal passes through the PMD variable device 11 just as it is.

The group delay time difference given in the polarization delay section 32 is changed to $2^3=8$ states of $(\Delta1+\Delta2+\Delta3)$, $(\Delta1+\Delta2-\Delta3)$, $(\Delta1-\Delta2+\Delta3)$, $(\Delta1-\Delta2-\Delta3)$, $(-\Delta1+\Delta2+\Delta3)$, $(-\Delta1+\Delta2-\Delta3)$, $(-\Delta1-\Delta2+\Delta3)$ and $(-\Delta1-\Delta2-\Delta3)$, and any one of these states is consecutively selected in accordance with the variable pattern. As a result, for the optical signal passed through the PMD providing apparatus 10, exclusive of the header portion, both of the polarization rotation state and the group delay time difference between the cross polarization mode components are scrambled at a high speed in accordance with the variable pattern previously determined between the optical sender 1 and the optical receiver 2. What PMD is given to the optical signal in accordance with the variable pattern at this time depends on the PMD variable device 11 as the hardware, and to be specific, is uniquely determined depending on the configurations and characteristics of the polarization rotating section 31 and the polarization delay section 32.

Note, an attention should be paid on that an operation of the PMD providing apparatus 10 as described above is different from an operation of a typical polarization scrambler which fluctuates only a polarization state of an optical signal. Namely, the operation of the above PMD providing apparatus 10 enables the realization of a new function of fluctuating both of the polarization rotation state and the group delay time difference, so to speak "two elements scrambling".

The optical signal passed through the PMD providing apparatus 10 is propagated through the optical line network 3 toward the optical receiver 2, to be given to the PMD variable device 21 in the PMD restoring apparatus 20 arranged on the former stage of the optical receiver 2. To the polarization rotating section 31 and to each of the polarization conversion devices $32C_1$ to $32C_3$ of the polarization delay section 32 in the PMD variable device 21, the driving control signal which is generated in the driving control circuit 22 according to the variable pattern generated by the variable pattern generator 23 is supplied in synchronism with the driving control signal given to the PMD variable device 11 in the PMD providing apparatus 10. For the optical signal input to the PMD variable device 21, a portion equivalent to the payload exclusive of the header is subjected to the polarization rotation which is changed at a high speed in accordance with the variable pattern, in the polarization rotating section 31. Thereafter, the optical signal is propagated through the optical waveguide portions $32B_1$ to $32B_3$ sequentially, so that a group delay time difference which is changed at a high speed in accordance with the variable pattern is given between the cross polarization mode components. Note, here a portion equivalent to the header of the optical signal passes through the PMD variable device 21 just as it is.

The polarization rotation given in the polarization rotating section 31 is the rotation in an opposite direction, which negates the polarization rotation given in the polarization rotating section 31 of the PMD providing apparatus 10. Such polarization rotation in the opposite direction is given to the optical signal while being changed at a high speed in accordance with the variable pattern, so that the polarization rotation state of the optical signal is returned to the state at the transmission time. Further, the group delay time difference given in the polarization delay section 32 is a group delay time difference of inverted sign which negates the group delay time difference given in the polarization rotating section 32 of the PMD providing apparatus 10. Such a group delay time difference of inverted sign is given to the optical signal while being changed at a high speed in accordance with the variable pattern, so that the group delay time difference between the cross polarization mode components is returned to the state at the transmission time from the optical sender 1. As a result, both of the polarization rotation state scrambled on the transmission side and the group delay time difference between the cross polarization mode components are negated, so that the optical signal passed through the PMD restoring apparatus 20 is restored to the state before the PMD is given on the transmission side.

The restoration of the optical signal is realized, only when the conditions are satisfied; that the variable pattern generated by the variable pattern generator 13 in the PMD providing apparatus 10 is coincident with the variable pattern generated by the variable pattern generator 23 in the PMD restoring apparatus 20, and also, that the configuration and characteristic of the PMD variable device 11 in the PMD providing apparatus 10 are substantially same as those of the PMD variable device 21 in the PMD restoring apparatus 20.

In order that the PMD variable devices 11 and 21 respectively used in the PMD providing apparatus 10 and the PMD restoring apparatus 20 satisfy the above condition, these variable devices need to be in the same lot manufactured by the same process in the same manufacturer. In other words, as an issue to be noted when designing the present optical communication system, it becomes important that the design of the PMD variable devices 11 and 21 used in the PMD providing apparatus 10 and the PMD restoring apparatus 20 is managed to be confidential against a third party other than a specific client (here, the user of the optical sender 1 and the optical receiver 2), and only a specific pair of the PMD variable devices is given to the client.

The optical signal restored to the state at the transmission time in the PMD restoring apparatus 20 as in the above manner is sent to the optical receiver 2 to be subjected to the reception processing. In the reception processing in the optical receiver 2, as an initial operation, the header of the optical signal passed through the PMD restoring apparatus 20 is read out and the information related to the destination or the like is verified. When the verification of the header information on the reception side is completed, the provision of PMD to the payload of the optical signal is started by the PMD providing apparatus 10 on the transmission side, and also, in synchronism with this, the restoration of the provided PMD is started by the PMD restoring apparatus 20 on the reception side. In the optical receiver after such an initial operation is finished, the payload information of the optical signal restored to the state at the transmission time is read out, and then, the identification processing of the data signal is performed.

As described above, according to the optical communication system in the first embodiment, the optical signal of 10 Gbit/s or the like output from the optical sender 1 is subjected to the PMD scrambling at a high speed in accordance with the variable pattern, to be transmitted to the optical line, network 3, and when the optical signal is received, the PMD contradictory to the PMD provided on the transmission side is given to the optical signal, so that the optical signal is restored to the original state. As a result, it becomes possible to keep the confidentiality of the optical signal transmitted between the optical sender 1 and the optical receiver 2 at the optical level. Such an optical signal provided with the PMD which is changed at a high speed in accordance with the variable pattern cannot be restored to the original state, unless the PMD variable device 21 having the configuration and characteristic same as those of the PMD variable device 11 used on the transmission side is prepared on the reception side and also, the PMD variable device 21 is driven in accordance with the variable pattern which is common to the transmission side. Therefore, it is possible to ensure the confidentiality of transmitted information at a very high level. Even if the optical signal provided with the PMD is converted into an electric signal to be recorded by a light receiving element, since the information related to the PMD of the optical level is lost at the reception time, it is impossible to analyze the PMD provided to the optical signal by utilizing a large-scale computer or the like, and also it is significantly difficult to analyze following the variable pattern at a high speed exceeding several GHz. In addition, in comparison with the conventional spread optical spectrum communication, since it becomes possible to ensure the confidentiality at the optical level only by adding the PMD providing apparatus 10 and the PMD restoring apparatus 20 to an existing optical communication system, the present invention can flexibly cope with optical communication systems of various types.

Note, in the first embodiment described above, the polarization delay section 32 of each of the PMD variable devices 11 and 21 is divided into three elements (optical waveguide portions $32B_1$ to $32B_3$ and the polarization conversion devices $32C_1$ to $32C_3$), to give group delay time differences of $2^3$ states between the cross polarization mode components. However, the present invention is not limited to the above, and it is possible to divide the polarization delay section 32 into elements of arbitrary numbers thereby giving group delay time differences. If the polarization delay section 32 is divided into a larger number of elements, since a number of combinations of group delay time differences given to the optical signal is increased (if the polarization delay section 32 is divided into N elements, resulting in combinations of $2^N$ states), it becomes possible to enhance the confidentiality of the optical signal.

Figure 3:
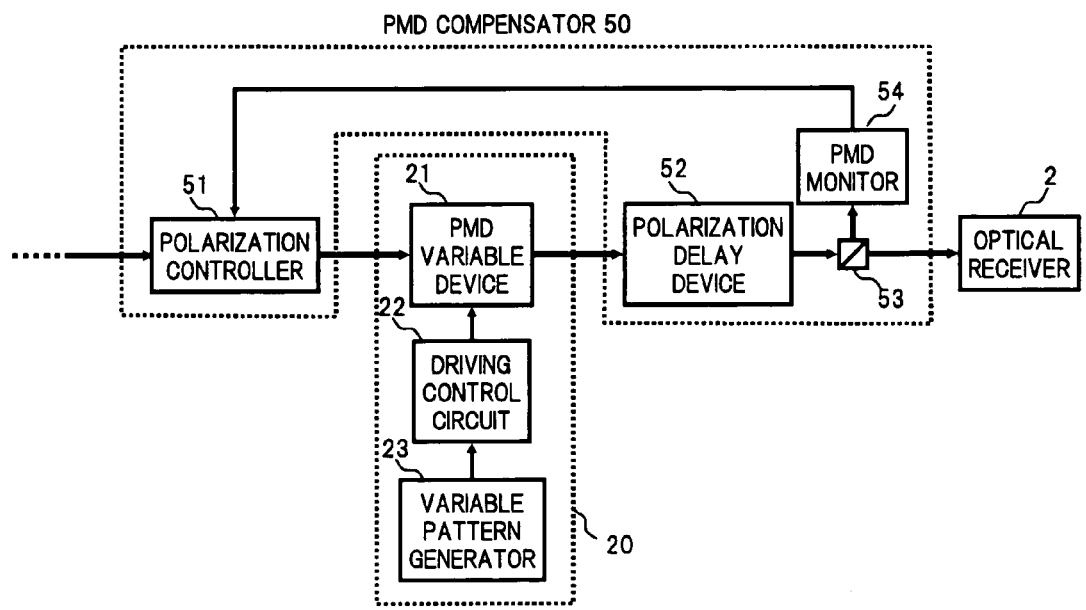
FIG. 3 is a block diagram showing an application example related to the first embodiment.

Further, in the first embodiment described above, although there is not particularly provided a configuration for compensating for the PMD which occurs due to the propagation of the optical signal through the optical line network 3, it is possible to arrange a PMD compensator 50 of known configuration on the reception side as shown in FIG. 3 for example, thereby compensating for the PMD occurred in the optical line network 3. In this case, it is preferable that a polarization controller 51 of the PMD compensator 50 is disposed on the former stage of the PMD restoring apparatus 20, and a polarization delay device 52 and PMD monitor 54 of the PMD compensator 50 are disposed on the latter stage of the PMD restoring apparatus 20. Note, the polarization controller 51 of the PMD compensator 50 is for rotating a direction of polarization plane of the optical signal according to a monitoring result of the PMD monitor 54, and the polarization delay device 53 is for giving a constant group delay time difference between the cross polarization mode components of the optical signal whose polarization direction is controlled by the polarization controller 51.

Moreover, in the first embodiment described above, the description has been made on the case where the PMD is not provided to the header portion of the optical signal. However, the configuration may be such that, for example, the optical pulse width of the header portion is set widely to the extent that it is not affected by the PMD scrambling, that is, a transfer rate of the header portion of the optical signal is lowered (for example, the transfer rate of several MHz to the PMD scrambling of several GHz or the like), to subject the PMD scrambling to both of the header and payload of the optical signal.

Next, there will be described a second embodiment of the optical communication system according to the present invention.

In the first embodiment described above, the assumption has been made on the system in which the optical signal of high speed, for example 10 Gbit/s or the like, is transmitted between the optical sender 1 and the optical receiver 2. However, in the case of a system in which an optical signal of lower speed, for example 100 Mbit/s or the like, is transmitted, it is necessary to increase a degree of the PMD to be given to the optical signal for the purpose of keeping the confidentiality of transmitted information at the optical level. This is because the group delay time difference between the cross polarization mode components needs to be wider than the pulse width of the optical signal. If a device giving a large group delay time difference to the optical signal is configured with the polarization delay section 32 using the LN substrate as in the first embodiment, there is caused a drawback in that the total length of the optical waveguide 32A becomes significantly longer. Therefore, in the second embodiment, there will be described one example suitable for the system of relatively slow speed.

Figure 4:
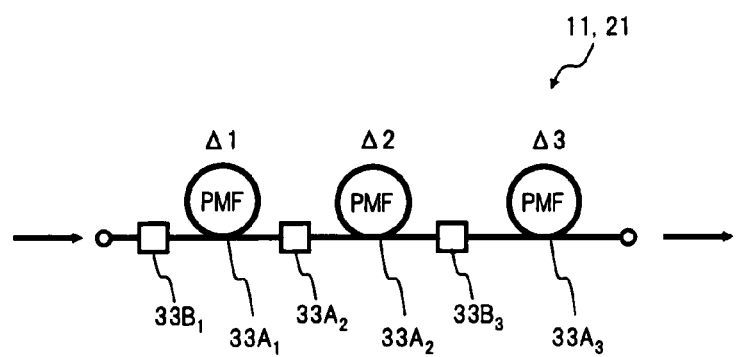
FIG. 4 is a block diagram showing one example of a PMD variable device used in a second embodiment of the optical communication system according to the present invention.

FIG. 4 is a block diagram showing one example of a PMD variable device used in the optical communication system in the second embodiment. Note, the entire configuration of the optical communication system is similar to that in the first embodiment shown in FIG. 1, and accordingly, the description thereof is omitted here.

The configuration shown in FIG. 4 shows the respective PMD variable devices 11 and 21 used in the PMD providing apparatus 10 and the PMD restoring apparatus 20 in FIG. 1. Each of the PMD variable devices 11 and 21 in FIG. 4 is configured by connecting a plurality (here, three) of polarization maintaining fibers (to be referred to as PMF hereunder) in series via polarization rotating elements $33B_1$, $33B_2$ and $33B_3$. The respective PMFs $33A_1$ to $33A_3$ are optical transmission mediums of low cost and low loss, having optical path lengths which are different from each other in a fiber axis direction to the cross polarization mode, to occur the constant PMD between the cross polarization mode components. The polarization rotating elements $33B_1$, $33B_2$ and $33B_3$ are known devices, each rotating the polarization of the input optical signal in accordance with the driving control signal from the driving control circuit 12 or the driving control circuit 22 to output the optical signal. As a specific example of each of the polarization rotating elements $33B_1$, $33B_2$ and $33B_3$, there is one configured by using an LN waveguide, a Faraday rotator having a variable rotation angle or a liquid crystal.

In each of such PMD variable devices 11 and 21, the optical signal sent from the optical sender 1 or the optical line network 3 is given to the PMF $33A_1$ via the polarization rotating element $33B_1$, so that the optical signal is subjected to the polarization rotation by the polarization rotating element $33B_1$ in accordance with the driving control signal, and thereafter, a group delay time difference of Δ1 is given between the cross polarization mode components by the PMF $33A_1$. Then, the optical signal passed through the PMF $33A_1$ is given to the PMF $33A_2$ via the polarization rotating element $33B_2$, and further given to the PMF $33A_3$ via the polarization rotating element $33B_3$, so that the optical signal is subjected to the polarization rotation by the polarization rotating elements $33B_2$ and $33B_3$ in accordance with the driving control signal, and thereafter, group delay time differences Δ2 and Δ3 are given between the cross polarization mode components by the PMFs $33A_2$ and $33A_3$.

According to the optical communication system in the second embodiment as described above, an effect similar to that in the first embodiment can be achieved, and also it becomes possible to easily realize a PMD variable device capable of providing the large PMD to the optical signal, in the system transmitting the optical signal of relatively low speed for example 100 Mbit/s or the like.

Note, in the second embodiment, the respective PMFs $33A_1$ to $33A_3$ are connected in series via the polarization rotating elements $33B_1$ to $33B_3$. However, it is also possible to simplify the configuration, by omitting the polarization rotating elements $33B_1$ to $33B_3$, to connect the PMFs $33A_1$ to $33A_3$ to each other so that main axes thereof are different angles. In this case, the PMD scrambling in accordance with the variable pattern is not performed, and therefore, the level of information confidentiality is lowered compared with the second embodiment. However, this configuration can be realized at extremely low cost. Therefore, if it is considered that a value of cipher is generally determined by an encryption cost to a cost required for breaking the cipher, such a configuration is useful as the simple encryption of the optical level.

INDUSTRIAL APPLICABILITY

According to an optical communication system and an optical communication method having confidentiality in the present invention, an optical signal output from an optical sender is given with the polarization-mode dispersion which is changed in accordance with a variable pattern, to be transmitted to an optical transmission path, and when the optical signal is received, the optical signal is given with the polarization-mode dispersion negating the polarization-mode dispersion given on the transmission side, to be restored to the state at the transmission time. As a result, since the confidentiality of the optical signal transmitted between the optical sender and an optical receiver can be kept at the optical level so that the optical communication ensuring the high safety can be realized, a large industrial applicability can be achieved.

What is claimed is:

1. An optical communication system for transmitting and receiving optical signals between an optical sender and an optical receiver via an optical transmission path, comprising:
  a polarization-mode dispersion providing apparatus that includes a first element which gives a variable polarization-mode dispersion to an optical signal transmitted from said optical sender, and drives said first element in accordance with a variable pattern previously determined between said optical sender and said optical receiver, to send the optical signal provided with the variable polarization-mode dispersion to said optical transmission path; and
  a polarization-mode dispersion restoring apparatus that includes a second element which gives the variable polarization-mode dispersion to the optical signal sent from said optical transmission path to said optical receiver and also has a configuration and a characteristic substantially same as those of said first element, and drives said second element in accordance with said variable pattern, to give the optical signal the polarization-mode dispersion negating the variable polarization-mode dispersion provided by said polarization-mode dispersion providing apparatus, thereby sending the optical signal restored to the state at the transmission time, to said optical receiver.

2. An optical communication system according to claim 1, wherein said first element and said second element each includes a polarization rotating section that subjects the optical signal to the polarization rotation which is changed in accordance with said variable pattern, end a polarization delay section that gives a group delay time difference which is changed in accordance with said variable pattern, between cross polarization mode components of the optical signal.

3. An optical communication system according to claim 2, wherein said polarization delay section divides an optical waveguide formed on a substrate having an electro-optic effect into a plurality of portions via polarization conversion devices of N numbers each of which interconverts the cross polarization mode components, and controls said polarization conversion devices in accordance with said variable pattern, to give group delay time differences of $2^N$ states between the cross polarization mode components of the optical signal.

4. An optical communication system according to claim 3, wherein said optical waveguide is formed on a lithium niobate substrate.

5. An optical communication system according to claim 2, wherein said polarization rotating section comprises a half-wave plate and a quarter-wave plate.

6. An optical communication system according to claim 2, wherein said polarization rotating section comprises a Faraday rotator having a variable rotation angle.

7. An optical communication system according to claim 2, wherein said polarization rotating section comprises a liquid crystal.

8. An optical communication system according to claim 1, wherein said first element and said second element each includes a plurality of polarization maintaining fibers and a plurality of polarization rotating elements which connect said polarization maintaining fibers to each other.

9. An optical communication system according to claim 8, wherein each of said polarization rotating elements is configured by using a lithium niobate substrate.

10. An optical communication system according to claim 8, wherein said polarization rotating elements each comprises a Faraday rotator having a variable rotation angle.

11. An optical communication system according to claim 8, wherein said polarization rotating elements each comprises a liquid crystal.

12. An optical communication system according to claim 8, wherein said polarization maintaining fibers are connected to each other so that main axes thereof are different angles, in place of being connected via said polarization rotating elements.

13. An optical communication system according to claim 1, further comprising;
  a polarization-mode dispersion compensator compensating for the polarization-mode dispersion occurred due to the propagation of the optical signal through said optical transmission path.

14. An optical communication method for transmitting and receiving optical signals between an optical sender and an optical receiver via an optical transmission path, comprising:
  driving a first element which gives a variable polarization-mode dispersion to an optical signal transmitted from said optical sender, in accordance with a variable pattern previously determined between said optical sender and said optical receiver, to send the optical signal provided with the variable polarization-mode dispersion to said optical transmission path; and
  driving a second element which gives the variable polarization-mode dispersion to the optical signal sent from said optical transmission path to said optical receiver and also has a configuration and a characteristic substantially same as those of said first element, in accordance with said variable pattern, to give the optical signal a polarization-mode dispersion negating the provided variable polarization-mode dispersion, thereby sending the optical signal restored to the state at the transmission time, to said optical receiver.

15. An optical communication method according to claim 14,
wherein information related to said variable pattern, and the configuration of said first and second elements is managed to be given to only a specific client, and the confidentiality of only the optical signal corresponding to said client is kept.

16. An optical communication method for transmitting and receiving optical signals between an optical sender and an optical receiver via an optical transmission path, comprising:
applying a variable polarization-mode dispersion to an optical signal transmitted from the optical sender, in accordance with a variable pattern previously determined between the optical sender and the optical receiver, and sending the optical signal provided with the variable polarization-mode dispersion to the optical transmission path; and
applying the variable polarization-mode dispersion to the optical signal received from the optical transmission path, the variable polarization-mode dispersion having a characteristic to apply a polarization-mode dispersion which negates the variable polarization-mode dispersion applied to the optical signal transmitted from the optical sender, and sending the optical signal which is restored to the optical receiver.

* * * * *

UNITED STATES PATENT AND TRADEMARK OFFICE
CERTIFICATE OF CORRECTION

PATENT NO. : 6,999,655 B2
APPLICATION NO. : 11/063557
DATED : February 14, 2006
INVENTOR(S) : Nobuhiro Fukushima It is certified that error appears in the above-identified patent and that said Letters Patent is hereby corrected as shown below:

column 11, line 51, in claim 2, delete "end" and insert --and--

Signed and Sealed this

Fifteenth Day of August, 2006

JON W. DUDAS
*Director of the United States Patent and Trademark Office*